Patented June 6, 1950

2,510,112

UNITED STATES PATENT OFFICE 2,510,112

POLYMER COMPOSITIONS

George E. Holbrook, Wilmington, Del., assignor to E. I. du Pont de Nemours & Company, Wilmington, Del., a corporation of Delaware No Drawing. Application July 8, 1948,
Serial No. 37,529

14 Claims. (Cl. 260—29.6)

This invention relates to polymer compositions and particularly to compositions of colloidal polymerized tetrafluoroethylene, and to methods of preparing such compositions.

Polymerized tetrafluoroethylene and the methods of preparing it are disclosed and claimed in Patent No. 2,230,654 to Plunkett. It is generally obtained as a white or brown powder or a jelly which rapidly changes to a powder. It is insoluble in all known solvents, is inert to the usual chemical reagents and does not burn. It is a crystalline material which undergoes a reversible transition at 327° C. and above, whereby it becomes less crystalline and somewhat amorphous and loses much of its tensile strength but does not become liquid or fluid, retaining its physical form and being deformable only slowly at high pressures. Also, at temperatures of 327° C. and above, it will sinter, that is, coalesce into a solid mass, but it has no true melting point. It is not affected by hydrocarbon oils and is not softened or swelled by such oils.

Because of its inertness to solvents, chemicals and heat, polymerized tetrafluoroethylene is a very valuable material. However, due to its toughness, inflexibility and low plasticity, even at high temperatures, the usual methods for molding and extruding plastic materials are impractical or uneconomical with this polymer and hence special techniques have had to be devised for shaping it into even simple forms. A representative technique is that disclosed by Brubaker et al., in Patent No. 2,500,099. Even with these special techniques, it can be molded into only simple shapes, such as sheets, strips, rods, etc., and machining must be resorted to in order to obtain articles of more complicated design. Heretofore, plasticizing agents for this polymer had rot been found.

The polymerized tetrafluoroethylene has a waxy appearance and feel and will not stick to other materials or readily to itself with any mechanical strength. Generally, temperatures of at least 350° C. and pressures in excess of 100 lbs./sq. in. are required to bond one piece of the polymer to another piece thereof and, under such conditions, the material is deformed.

K. L. Berry has discovered and, in his application Serial No. 695,059 filed September 5, 1946, now Patent number 2,478,229 has disclosed stabilized concentrated aqueous dispersions of colloidal polymerized tetrafluoroethylene, containing from about 25% to about 75% polymer. He discloses that these dispersions may be obtained by polymerizing the tetrafluoroethylene in the presence of water, adding a surface-active agent to the dilute suspension, flocculating the polymer by insolubilizing the surface-active agent, separating the flocculated polymer and a small proportion of the aqueous phase from the bulk of the aqueous phase, and then peptizing the flocculated polymer. The surface-active agents may be anion-active compounds of the class of ammonium, alkali metal and amine salts of long chain carboxylic, sulfonic, and sulfuric acids, or cation-active compounds of the class of quaternary ammonium salts containing long aliphatic hydrocarbon chains. The polymer, in the dilute suspensions, may be flocculated by salting out or acidification. Where the flocculation is accomplished by salting out, the subsequent peptization may be accomplished by dilution, by removing the salt by heating to volatilize or decompose it, by dialysis or by ion exchange. When the flocculation is produced by acidification, the subsequent peptization can be accomplished by adding a base. Other surface-active agents, which become insoluble upon change in temperature, may be used; in which case, the flocculation will be accomplished by changing the temperature to insolubilize the surface-active agent, and the subsequent peptization may be accomplished by adding a surface-active agent.

J. Denny Compton, Joseph W. Justice and Carl F. Irwin, in their copending application Serial No. 37,528 filed July 8, 1948, disclose that polymerized tetrafluoroethylene may be plasticized by heating it with a substantially completely fluorinated hydrocarbon oil (a fluorocarbon oil) at temperatures of from 150° C. to about 400° C. and preferably from about 327° C. to about 375° C. The polymer absorbs the fluorocarbon oil at a very slow rate at 150° C., the rate of absorption gradually increasing with increase in temperature up to about 327° C., and, at temperatures of about 327° C. and above, the absorption becomes substantially instantaneous with the polymer puffing to 2 to 3 times its original size. They disclose that they can thus obtain products containing from about 2% to about 75% by weight of fluorocarbon oil dissolved in the polymer. The resulting products are softer and more flexible than the untreated polymer, soften at lower temperatures and may be molded, extruded and bonded to themselves more readily and at lower temperatures and pressures. Their most plastic product, that containing 75% fluorocarbon oil, when in the form of a strip, requires a pressure of 4000 lbs./sq. in. in a hydraulic press at room temperature to effect a 100% increase in the area of the strip.

Polymerized tetrafluoroethylene is generally obtained in the form of a powder. When such powder is mixed with a fluorocarbon oil at room temperatures, the mixture will usually be in the form of a heavy paste which can be spread in the form of a coating. Such a coating, however, is grainy and devoid of tensile strength and toughness. Such mixture is sensitive to heat, its viscosity being reduced rapidly on heating up to 100° C. The fluorocarbon oil can be readily extracted from such a mixture by washing the mixture with a solvent for the fluorocarbon oil, such as trifluorotrichloroethane.

It is a general object of my invention to provide methods for making polymerized tetrafluoroethylene compositions. A specific and particular object is to provide methods for making plastic and greasy compositions of polymerized tetrafluoroethylene. A further object is to provide new plastic compositions of polymerized tetrafluoroethylene. Another object is to provide greases containing polymerized tetrafluoroethylene. Other objects are to provide new and improved heat-convertible adhesives for bonding polymerized tetrafluoroethylene to itself. Still other objects are to advance the art. Still further objects will appear hereinafter.

The above and other objects may be accomplished in accordance with my invention which comprises mixing an aqueous dispersion of colloidal polymerized tetrafluoroethylene with from about 0.25 to about 9 parts by weight, based on the polymer, of a substantially completely fluorinated hydrocarbon oil distilling at temperatures in the range of from about 50° C. to about 300° C. at 10 mm. Hg pressure and coagulating the dispersion while stirring the mixture, then settling the mixture and separating the mixture of polymer in fluorinated oil from the aqueous phase. As a result of such procedure, the colloidal polymer is incorporated in the fluorinated oil in the form of a stable homogeneous colloidal suspension or colloidal-solution. By "stable," I mean that the suspension does not break, i. e., neither polymer nor fluorocarbon oil will separate from the suspension, on long standing under atmospheric conditions. The fluorinated oil cannot be pressed out of the suspension under high pressures and is not readily extracted by washing at room temperatures with a solvent for the fluorinated oil, such as trifluorotrichloroethane, but substantial proportions can be extracted by washing with such solvent under reflux for several hours.

The resulting suspensions vary in properties from soft plastic materials to greases. The suspensions, containing from about 20% to about 59% by weight of fluorocarbon oil and 80% to 41% by weight of colloidal polymer, are plastic materials. Those, containing from about 60% to about 90% fluorocarbon oil and from about 40% to about 10% polymer, have the properties of greases and may be employed as heat-convertible adhesives for adhering massive polymerized tetrafluoroethylene to metals melting above 375° C. or to itself, as by applying a coating of the greasy composition on the polymerized tetrafluoroethylene and pressing against the metal or piece of polymer while heating to from about 325° C. to about 400° C.

The plastic materials are softer and more flexible than the untreated polymer, soften at lower temperatures and may be molded, extruded and bonded to themselves more readily and at lower temperatures and pressures but have a high tensile strength at room temperature. Also, my suspensions are all substantially softer than the products of Compton, Justice and Irwin, disclosed in their copending application hereinbefore referred to. For example, a strip of a suspension of my invention, containing 25% colloidal polymerized tetrafluoroethylene and 75% fluorocarbon oil, can be increased 400% to 500% in area by pressing in a hydraulic press at less than 100 lbs./sq. in. at room temperatures. Such product is very sticky, sticking to metals, glass and other materials but more readily to itself, and the fluorocarbon oil is not pressed out of the composition under such conditions.

The greases are useful as lubricants under highly corrosive conditions and as heat-convertible adhesives for bonding massive polymer to itself. The suspensions of my invention do not have a melting point, but, when heated at from about 325° C. to about 400° C., convert irreversibly to plastic materials of the character of those disclosed by Compton, Justice and Irwin in their copending application hereinbefore referred to. Accordingly, the suspensions of my invention are useful as intermediates for the preparation of the products of Compton, Justice and Irwin.

The substantially completely fluorinated hydrocarbon oils, which may be employed in accordance with my invention are those which have a distilling range at 10 mm. Hg pressure within the range of from about 50° C. to about 300° C. (about 150° C. to about 460° C. at atmospheric pressures). The term "substantially completely fluorinated" means that substantially all of the hydrogen atoms of the compounds in the hydrocarbon oil have been replaced by fluorine so that the fluorinated oil contains at least 75% chemically combined fluorine. For convenience, the substantially completely fluorinated hydrocarbon oils are referred to herein as "fluorocarbon oils." These fluorocarbon oils may be obtained by fluorinating a hydrocarbon oil by methods known to the art and then fractionating the fluorinated oil, usually at 10 mm. Hg pressure, to obtain products of desired boiling range.

The hydrocarbon oils, employed for preparing the fluorocarbon oils, are mixtures of hydrocarbons and may be naturally occurring mineral oils, such as paraffinic base, naphthenic base or highly aromatic petroleum oils, usually highly refined, or synthetic hydrocarbon oils of similar composition, such as the Fischer-Tropsch oils. Preferably, the hydrocarbon oils are composed wholly or mainly of aliphatic hydrocarbons. Usually, the hydrocarbon oil is vaporized, the vapors diluted with an inert gas, and the mixture then passed over a fluorinating agent, such as cobalt trifluoride. Representative fluorocarbon oils and methods for preparing them are disclosed in the articles appearing in Industrial and Engineering Chemistry, vol. 39, No. 3, March 1947, on pages 290 to 291, 292 to 298, 319 to 329, 343 to 345, 350 to 352 and 352 to 354. The fluorocarbon oils, employed in the following examples, were prepared by the process disclosed in the article by Irwin et al., appearing on pages 350 to 352, inclusive, of such publication.

While a fluorocarbon oil fraction distilling over the full range of from about 50° C. to about 300° C. at 10 mm. Hg pressure may be employed, it will generally be desirable to employ fractions distilling over narrower ranges within such broad range. It will usually be preferred to employ fluorocarbon oil fractions having distilling ranges wholly above 80° C. at 10 mm. (200° C. at atmospheric pressures) and, particularly, those having distilling ranges between 80° C. and about 240° C. at 10 mm. (200° C. to 400° C. at atmospheric pressure). I specially prefer to employ fractions having distilling ranges falling in the range of from about 130° C. and about 240° C. at 10 mm. Hg pressure. The lower boiling fluorocarbon oil fractions will generally give slightly softer products with slightly lower softening temperatures than the higher boiling fractions. However, the plasticity and softening temperature of the products will be dependent primarily upon the proportion of fluorocarbon oil therein rather than on the distilling range of the fluorocarbon oil fraction employed.

Suitable aqueous dispersions of colloidal polymerized tetrafluoroethylene, which may be employed in accordance with my invention, are those of the character disclosed by K. L. Berry, in application Serial No. 695,059, hereinbefore referred to. I particularly prefer such dispersions which are stabilized by anion-active surface-agents of the class of ammonium, alkali metal and amine salts of long-chain carboxylic, sulfonic and sulfuric acids, and particularly, the sodium salts of long chain alkyl sulfates. In the following examples, the aqueous dispersions contained about 1% of a commercial wetting agent which was a mixture of sodium alkyl sulfates obtained by the sulfation of the mixture of alcohols produced by the hydrogenation of coconut oil. Such mixture of alcohols is generally known as "Lorol" alcohols and is composed, approximately, of 45% of the straight-chain primary alcohol of 12 carbon atoms, 35 to 40% of the straight-chain primary alcohol of 14 carbon atoms, 10% of the straight-chain primary alcohol of 16 carbon atoms, with the balance made up of the straight-chain primary alcohols containing 10 to 18 carbon atoms.

The compositions of my invention are obtained by stirring together the fluorocarbon oil and the aqueous dispersion of colloidal polymerized tetrafluoroethylene while coagulating the aqueous dispersion. This procedure is essential as the polymer will not transfer from the aqueous phase to the fluorocarbon oil phase without such coagulation. The aqueous dispersions may be coagulated by the methods disclosed by Berry for flocculating the polymer in such dispersions. Preferably, however, I coagulate the aqueous dispersion by adding thereto a water-miscible organic liquid, such as methanol, ethanol, acetone, and the like. The water-miscible organic liquid will be employed in the proportion of at least one volume to each volume of the aqueous dispersion and, particularly, in the proportion of 3 or more volumes of organic liquid to each volume of the dispersion. The coagulation occurs at a slow rate when only one volume of organic liquid is employed for each volume of the aqueous dispersion. The coagulation proceeds at a rapid rate when the organic liquid is employed in the proportion of 3 or more volumes to each volume of aqueous dispersion. Excessive amounts of the organic liquid are not harmful because both the polymer and the fluorocarbon oil are insoluble in such organic liquids. Such coagulation may be carried out at temperatures of from about 0° C. to about 100° C., but below the boiling point of the water-miscible organic liquid. Usually, it will be carried out at about room temperatures, and, except where otherwise indicated, such coagulations in the examples were carried out at room temperatures.

The coagulation may also be carried out by freezing. The aqueous suspension of colloidal polymerized tetrafluoroethylene and the fluorocarbon oil are placed in a vessel and frozen, as by surrounding the vessel with a mixture of carbon-ice and acetone. The frozen mass is then allowed to warm up. As the mass begins to melt, it is stirred vigorously. Usually, this procedure results in the transfer of only part of the colloidal polymer to the fluorocarbon oil phase, and it is then necessary to repeat the procedure two or more times in order to effect a complete transfer of the colloidal polymer from the aqueous phase to the fluorocarbon oil phase.

In order to more clearly illustrate my invention, preferred modes of carrying the same into effect and advantageous results obtained thereby, the following examples are given:

Example 1

4 grams of fluorocarbon oil (distilling range 150–170° C./10 mm.), 2.5 g. of a 60% aqueous suspension of colloidal polymerized tetrafluoroethylene and 3 ccs. water were placed in a test tube. While being stirred at room temperature, 6 g. of acetone were added. The tetrafluoroethylene polymer was transferred to the fluorocarbon oil phase, leaving a clear supernatant aqueous phase. The phases were separated and the fluorocarbon oil phase had a very greasy consistency and was useful as a lubricant, e. g., for use on plug-cocks exposed to corrosive acids.

Example 2

10 grams (5 cc.) of fluorocarbon oil (distilling range 130–150° C./10 mm.) and 2.6 g. of a 58% aqueous suspension of colloidal polymerized tetrafluoroethylene were placed in a test tube and about 2 ccs. of acetone added. The contents of the tube were then stirred vigorously at room temperature. The polymer was thereby transferred to the fluorocarbon oil phase which was then separated from the aqueous phase. The product had a thin greasy consistency and contained 87% fluorocarbon oil.

Example 3

A grease was prepared in the same manner as in Example 2, employing a fluorocarbon oil (distilling range 150–170° C./10 mm.) in an amount to provide a grease containing 73% fluorocarbon oil. This grease was spread evenly and thinly on the inside surface of a nickel crucible. The crucible was then heated gently in a Bunsen burner flame until the film fused (330° C.) and then cooled. Concentrated nitric acid would not then wet the walls of the crucible. Scraping with a knife disclosed the presence of a very thin adherent plastic film on the inner surface of the crucible.

Example 4

A composition, containing 55% of colloidal polymerized tetrafluoroethylene and 45% of fluorocarbon oil (distilling range 130–300° C./10 mm.), was prepared by the method of Example 1, i. e., by mixing a 60% aqueous suspension of the polymer, the fluorocarbon oil and acetone with stirring at room temperature. 12 grams of this composition was pressed in a hydraulic press at room temperature. It was then transferred to a similar press, the platens of which were heated to 308° C., pressed at 2000 lbs./sq. in. and the temperature of the platens raised to 325° C., held for 5 minutes, then allowed to cool to 300° C. before releasing the pressure, and then quenched in cold water. The resulting plasticized polymer weighed 9 g. and its fluorocarbon oil content was approximately 27%, part of the fluorocarbon oil being lost by vaporization during the processing. The product was soft and pliable and could be stretched by hand. It was similar to the product, obtained by heating a strip of polymerized tetrafluoroethylene in fluorocarbon oil (distilling range 210–240° C./10 mm.) up to 330° C. until the product contained 30% fluorocarbon oil, but was more elastic and translucent. Similar polymer of similar thickness, but not treated with fluorocarbon oil, cannot be stretched by hand.

*Example 5*

The same procedure as in Example 1 was followed, using fluorocarbon oil having a distilling range of 190–210° C./10 mm. The product obtained was very sticky and greasy at ordinary temperatures and was valuable for coating glass and metal equipment with thin films which are resistant to water, solvents and other chemicals.

*Example 6*

A product, containing 40% colloidal polymerized tetrafluoroethylene and 60% fluorocarbon oil, was prepared as described in Example 1, using fluorocarbon oil having a distilling range of 130–240° C./10 mm. It was a very thick, tacky grease but not as sticky as the product obtained in Example 5. This product was a good heat-convertible adhesive for tetrafluoroethylene polymer. When the product was spread thinly between 2 sheets of 1/16" tetrafluoroethylene polymer and the sheets treated in a hydraulic press at 50 lbs./sq. in. and 327° C. to 330° C., the product converted and bonded the sheets together so firmly that the sheets were torn in attempting to pull them apart. Thinner strips of polymer were similarly bonded with the above composition.

*Example 7*

A product, containing 60% of colloidal polymerized tetrafluoroethylene and 40% fluorocarbon oil (distilling range 60–300° C./10 mm.), was prepared as described in Example 1. The product was not tacky or greasy but was pliable and could be rolled into a sheet. It was found to be useful for insulation of electrical equipment.

It will be understood that the preceding examples have been given for illustrative purposes solely and my invention is not limited to the specific embodiments therein. Many variations and modification in the proportions, the fluorocarbon oil fractions, the method of coagulation of the aqueous dispersion and in otherwise carrying out my process will be apparent to those skilled in the art. If desired, pigments, fillers, fibers and the like may be incorporated in my composition.

From the preceding description and examples, it will be apparent that I have provided a new class of compositions having a wide range of properties and which are useful for many various purposes. Since the fluorocarbon oil and the polymerized tetrafluoroethylene are both highly resistant to the action of chemicals and heat, my compositions are particularly useful where extremely corrosive conditions or high temperatures are encountered. Even the plastic products are readily worked and can be formed into more intricate shapes by more simple methods than can the untreated polymer. Accordingly, it will be apparent that my invention constitutes a valuable contribution to the art.

I claim:

1. A stable suspension of colloidal polymerized tetrafluoroethylene in a substantially completely fluorinated hydrocarbon oil distilling at temperatures in the range of from about 50° C. to 300° C. at 10 mm. Hg pressure, the fluorinated oil constituting from about 20% to about 9% by weight of the suspension and the colloidal polymerized tetrafluoroethylene constituting from about 80% to about 10% by weight of the suspension.

2. A plasticized solid polymer composition which is a stable suspension of colloidal polymerized tetrafluoroethylene in a substantially completely fluorinated hydrocarbon oil distilling at temperatures in the range of from about 50° C. to about 300° C. at 10 mm. Hg pressure, the fluorinated oil constituting from about 20% to about 59% by weight of the suspension and the colloidal polymerized tetrafluoroethylene constituting from about 80% to about 41% by weight of the suspension.

3. A stable suspension of colloidal polymerized tetrafluoroethylene in a substantially completely fluorinated hydrocarbon oil distilling at temperatures in the range of from about 50° C. to about 300° C. at 10 mm. Hg pressure, the fluorinated oil constituting from about 60% to about 90% by weight of the suspension and the colloidal polymerized tetrafluoroethylene constituting from about 40% to about 10% by weight of the suspension.

4. A stable suspension of colloidal polymerized tetrafluoroethylene in a substantially completely fluorinated hydrocarbon oil distilling at temperatures in the range of from about 80° C. to about 240° C. at 10 mm. Hg pressure, the fluorinated oil constituting from about 20% to about 90% by weight of the suspension and the colloidal polymerized tetrafluoroethylene constituting from about 80% to about 10% by weight of the suspension.

5. A stable suspension of colloidal polymerized tetrafluoroethylene in a substantially completely fluorinated hydrocarbon oil distilling at temperatures in the range of from about 130° C. to about 240° C. at 10 mm. Hg pressure, the fluorinated oil constituting from about 20% to about 90% by weight of the suspension and the colloidal polymerized tetrafluoroethylene constituting from about 80% to about 10% by weight of the suspension.

6. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 50° C. to about 300° C. at 10 mm. Hg pressure, employing from about 0.25 to about 9 parts by weight of fluorinated oil to each part of polymer, coagulating the aqueous dispersion while stirring the mixture, then settling the mixture, and separating the suspension of colloidal polymer in fluorinated oil from the aqueous phase.

7. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 80° C. to about 240° C. at 10 mm. Hg pressure, employing from about 0.25 to about 9 parts by weight of fluorinated oil to each part of polymer, coagulating the aqueous dispersion while stirring the mixture, then settling the mixture, and separating the suspension of colloidal polymer in fluorinated oil from the aqueous phase.

8. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 130° C. to about 240° C. at 10 mm. Hg pressure, employing from about 0.25 to about 9 parts by weight of fluorinated oil to each part of polymer, coagulating the aqueous dispersion while stirring the mixture, then settling the mixture, and separating the suspension of colloidal polymer in fluorinated oil from the aqueous phase.

9. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 50° C. to about 300° C. at 10 mm. Hg pressure, employing from about 0.25 to about 9 parts by weight of fluorinated oil to each part of polymer, coagulating the aqueous dispersion by adding at least one volume of a water-miscible organic liquid for each volume of the aqueous dispersion and stirring the mixture, then settling the mixture, and separating the suspension of colloidal polymer in fluorinated oil from the aqueous phase.

10. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 130° C. to about 240° C. at 10 mm. Hg pressure, employing from about 0.25 to about 9 parts by weight of fluorinated oil to each part of polymer, coagulating the aqueous dispersion by adding at least one volume of a water-miscible organic liquid for each volume of the aqueous dispersion and stirring the mixture, then settling the mixture, and separating the suspension of colloidal polymer in fluorinated oil from the aqueous phase.

11. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 50° C. to about 300° C. at 10 mm. Hg pressure, employing from about 0.25 to about 9 parts by weight of fluorinated oil to each part of polymer, coagulating the aqueous dispersion by adding at least one volume of acetone for each volume of the aqueous dispersion and stirring the mixture, then settling the mixture, and separating the suspension of colloidal polymer in fluorinated oil from the aqueous phase.

12. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 130° C. to about 240° C. at 10 mm. Hg pressure, employing from about 0.25 to about 9 parts by weight of fluorinated oil to each part of polymer, coagulating the aqueous dispersion by adding at least one volume of acetone for each volume of the aqueous dispersion and stirring the mixture, then settling the mixture, and separating the suspension of colloidal polymer in fluorinated oil from the aqueous phase.

13. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 50° C. to about 300° C. at 10 mm. Hg pressure, employing from about 0.25 to about 1.4 parts by weight of fluorinated oil to each part of polymer, coagulating the aqueous dispersion while stirring the mixture, then settling the mixture, and separating the suspension of colloidal polymer in fluorinated oil from the aqueous phase.

14. The process which comprises mixing an aqueous dispersion of colloidal polymerized tetrafluoroethylene, containing from about 25% to about 75% by weight of the polymer, with a substantially completely fluorinated hydrocarbon oil, distilling at temperatures in the range of from about 50° C. to about 300° C. at 10 mm. Hg pressure, employing from about 1.5 to about 9 parts by weight of fluorinated oil to each part of polymer, coagulating the aqueous dispersion while stirring the mixture, then settling the mixture, and separating the suspension of colloidal polymer in fluorinated oil from the aqueous phase.

GEORGE E. HOLBROOK.

No references cited.

Certificate of Correction

Patent No. 2,510,112 June 6, 1950

GEORGE E. HOLBROOK

It is hereby certified that errors appear in the printed specification of the above numbered patent requiring correction as follows:

Column 1, line 33, for the patent number "2,500,099" read *2,400,099*; column 2, line 49, for "temperattures" read *temperatures*; column 8, line 5, for "9%" read *90%*; and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*